United States Patent [19]

Chahine et al.

[11] 4,212,892

[45] Jul. 15, 1980

[54] METHOD OF PREPARING A HIGH-PROTEIN SNACK FOOD

[75] Inventors: M. Helmy Chahine; J. Alfred Brothers, both of Dartmouth, Canada

[73] Assignee: Nova Scotia Research Foundation Corporation, Canada

[21] Appl. No.: 810,724

[22] Filed: Jun. 28, 1977

[30] Foreign Application Priority Data

Apr. 13, 1977 [CA] Canada .................................. 276098

[51] Int. Cl.² ............................................. A23J 3/00
[52] U.S. Cl. .................................... 426/289; 426/573; 426/103; 426/656; 426/643; 426/657; 426/438; 426/808
[58] Field of Search .................... 426/89, 92, 93, 103, 426/289, 573, 574, 656, 657, 438, 808, 305, 643, 661, 560

[56] References Cited

U.S. PATENT DOCUMENTS

| | | | |
|---|---|---|---|
| 2,802,737 | 8/1957 | Anson et al. | 426/89 |
| 3,027,258 | 3/1962 | Markakis et al. | 426/808 X |
| 3,512,993 | 5/1970 | Conley et al. | 426/646 |
| 3,692,531 | 9/1972 | Heusdens et al. | 426/808 X |
| 3,836,677 | 9/1974 | Freck et al. | 426/92 X |
| 3,849,582 | 11/1974 | Blagdon et al. | 426/808 X |
| 3,851,081 | 11/1974 | Epstein | 426/573 X |
| 3,950,550 | 4/1976 | Katayama et al. | 426/94 |

FOREIGN PATENT DOCUMENTS

823610 9/1969 Canada.
976027 10/1975 Canada.
50-19616 7/1975 Japan.

*Primary Examiner*—Esther M. Kepplinger
*Attorney, Agent, or Firm*—Roylance, Abrams, Berdo & Farley

[57] ABSTRACT

A method is described for preparing a high-protein snack food. The method comprises admixing a plastic protein gel with about 17 to 50% by weight, based on weight of the gel, of dry starch or flour to obtain a homogeneous mass of protein gel-starch material which is subsequently extruded into desired shapes and thereafter cooked. Vegetable oil or fat may also be incorporated into the gel-starch material to improve the texture and taste of the final product. Preferred starches or flours include those derived from potato, corn and rice. The plastic protein gel, which is prepared by conventional procedures, may be fish, soybean gel, or mixtures containing both fish and soybean gels with the proviso that all steps prior to cooking must be carried out at a temperature of 5° C. or less when any fish gel is utilized. The cooked product can readily be prepared in the form of chips and can be coated subsequent to cooking with flavoring and/or flavor-enhancing agents. The snack food is highly palatable and is nutritionally superior to potato chips, having a recommended level of protein of about 18-20% as compared to conventional potato chips which contain a low level of protein equal to 7%.

19 Claims, No Drawings

METHOD OF PREPARING A HIGH-PROTEIN SNACK FOOD

BACKGROUND OF THE INVENTION

1. Field of the Invention

The present invention relates to the preparation of a high-protein snack food which is crisp, highly palatable, with good mouth-feel and texture.

2. Description of the Prior Art

In general, snack foods consist of a high proportion of starch and fat and one low in protein. An increasing number of the population, especially the youngsters, substitute snack foods for their regular meals. Therefore, it is a nutritional necessity to introduce a high-protein palatable food snack into the North American market.

Pottie Canadian Pat. No. 823,610, issued Sept. 23, 1969, and which is assigned to the assignee of the present invention, describes a method of preparing a fish chip by comminution gelling of fish flesh to form a plastic gel which is subsequently extruded into desired shapes and fried in oil. The fish chip so produced proved to be harsh in the mouth and left a sandy feeling in the throat upon consumption. Thus, the obvious nutritional advantages of producing a high-protein fish chip were defeated by the poor mouth feel and limited palatability of the product.

SUMMARY OF THE INVENTION

The present invention is concerned with the preparation of a high-protein snack food which is nutritionally superior to conventional products such as potato chips, and which can satisfy a taste panel evaluation based on texture, appearance, colour crispness, mouth feel, taste and palatability.

Broadly speaking, a satisfactory high-protein snack food has been produced by admixing a plastic protein gel with about 17 to 50% by weight based on weight of the gel, of dry starch or flour to obtain a homogeneous mass of gel-starch material, which is subsequently formed into desired shapes and thereafter cooked. Cooking may be conducted either by frying or baking.

The plastic protein gel utilized in the process of the invention can either be a fish gel prepared according to the teachings of aforementioned Canadian Pat. No. 823,610, a soybean gel prepared by conventional techniques, or a mixture of fish and soybean gels. When the plastic protein gel includes material of fish origin, all process steps prior to cooking must be carried out at a temperature of 5° C. or less in order to avoid degradation of the fish component.

Fish gel is produced by comminution of the minced flesh of several species of lean fish, e.g., haddock, cod, cusk, cat and ocean perch. During comminution a small increment of sodium chloride is added to improve the texture of the finished product. Addition of water during comminution of the minced fish flesh must be avoided.

The starches and flours particularly contemplated for use include potato starch, potato flour, modified or unmodified corn starch, and rice flour. The said starches or flours which are blended with the protein gel, be it fish gel, soybean gel or a mixture of both, must be in a dry form at the time of addition to the protein gel. The protein gels utilized in the invention contain sufficient water to permit preparation of a highly acceptable snack product, without the addition of any further water.

While fish muscle does not blend with dry starch or flour, the fish gel will blend homogeneously with dry starch or flour. In fact, fish gel-starch blends have proven quite stable, maintaining a homogeneous physical integrity over a temperature range from at least about −20° C. to 180° C. In addition, protein gel-starch blend, composed of soybean gel or a mixture of fish and soybean gels, maintained the same stable physical character.

Thickening, stabilizing, emulsifying agents, gums, e.g., algin, carrageenan and/or pH adjusters may be added to the fish gel, soybean gel or the homogeneous plastic mass of protein gel-starch blend. In addition, an amount of edible oil or fat may be incorporated into the protein-starch admixture, and a homogeneous plastic mass is formed. The protein gel may be fish protein gel, soybean protein gel or a mixture of both. Addition of oil or fat to the protein gel-starch blend tends to improve the texture and/or taste of the finished product. Following extrusion, cooking may be effected by either frying or baking.

According to a preferred embodiment cooking is effected by frying, particularly by deep frying in all-vegetable oil, to which an antioxidant has been added, at a temperature of about 180° C. The food snack prepared according to this preferred embodiment would normally be prepared in the form of a chip or julienne and would be packaged in a non-transparent plastic bag or aluminum foil, in the matter of conventional potato chips. The packaged snack product is capable of prolonged storage at ambient temperatures and in absence of light.

Baking is conducted either by using a conventional or microwave oven. The advantage of such procedure is that the snack food can be prepared to have a predetermined oil content. The baked snack food thus produced tends to have a relatively high water content, not normally permitting storage at ambient temperatures. The baked product can, however, be frozen subsequent to cooking, for sale to consumers as frozen "heat and serve" item.

EXAMPLE 1

Fish gel was prepared according to the teachings of disclosure pages 2 and 3 of Pottie Canadian Pat. No. 823,610.

Potato starch was added to separate 200 g portions of fish gel in respective amounts of 35 g, 50 g, 75 g and 100 g. Each sample was subsequently mixed mechanically by means of a kitchen blender in a refrigerated room maintained at a temperature of 5° C. or less. Mixing of each sample was continued until the constituents were completely blended and a uniform, homogeneous starch-gelatinous plastic protein mass formed. The mixing operation on the average required ten to twelve minutes.

The homogeneous starch-gelatinous plastic protein mass samples were then extruded at a temperature of 5° C. or less into rectangular thin chips about 1½ cms wide and 4 cms long.

Chips formed from each sample were subsequently fried in all-vegetable oil at a temperature of about 180° C.

The fried chips were coated with sodium chloride and monosodium glutamate, and some samples were coated with flavouring agents, including Bar-B-Que, Onion and Garlic, and Vinegar flavour.

No deterioration in microbiological quality was detected in fish chips packaged in sealed plastic bags during storage for 16 weeks at room temperature. The general bacterial content was determined every four weeks under aerobic and anaerobic conditions, and was eventually zero. No food poisoning organisms and their indicators (coliforms, staphylococci, salmonellae) were detected. In addition no proteolytic anaerobes were present.

The protein content ranged from 14 to 25% in fried chips prepared from gel-potato starch blend, when the potato starch consisted of 17 to 50% by weight based on weight of the gel. In this range of protein content the chips had good texture, appearance, color, crispness, mouth feel and palatability, as evaluated by a taste panel.

Similar results were obtained when potato flour, modified and unmodified corn starch, or rice flour, replaced potato starch.

Additionally, the use of mixtures of starches and/or flours resulted in entirely acceptable products, thus suggesting that the choice of the starches or flours to be utilized may be dictated by practical consideration such as cost and availability of particular starches or flours, and consumer preference.

EXAMPLE II

A protein gel of soybean origin was prepared by mixing 180–190 g of sodium proteinate in the form of isolate with 1 liter of water. The isolate could be replaced by 240–250 g of soybean protein concentrate, provided that 6–8 g of sodium chloride are dissolved in the water. The stirred slurry was placed in a stainless steel covered container and heated in an autoclave at a temperature of 80° to 100° C. for 15 to 30 minutes. The container was thereafter immediately cooled by immersion in ice-cold water.

If the formed soybean protein gel is not processed directly into a finished product, it should be stored in a frozen state at about −20° C. Before subsequent processing the frozen mass is thawed, replasticized and further processed.

Potato starch was added to individual 200 g portions of the soybean gel in respective amounts of 35 g, 50 g, 75 g and 100 g and the samples mixed then extruded at room temperature into chips which were cooked and coated in the manner set out in Example 1.

The protein content ranged from 14 to 25% in fried chips prepared from gel-potato starch blend, where the potato starch consisted of 17 to 50% by weight based on weight of the gel. In this range of protein content, the chips had good texture, appearance, colour, crispness, mouth feel and palatability, as evaluated by a taste panel.

Similar results were obtained when potato flour, modified or unmodified corn starch, or rice flour, replaced potato starch.

Additionally, the use of mixtures of starches and/or flours resulted in entirely acceptable products, thus suggesting that the choice of the starches or flours to be utilized may be dictated by practical considerations such as cost and availability of particular starches or flours, and consumer preference.

The use of soybean gel is attractive from a standpoint of cost. However, it should be pointed out that fish contains higher concentrations of certain essential amino acids than soybeans. These amino acids are lysine, methionine and cystine.

EXAMPLE III

Amounts of fish gel prepared according to Example I and amounts of soybean gel prepared according to Example II were well blended together, at a temperature of about 5° C. or less (as in Example I), in proportions of 2:1, 1:1 and 1:2 until homogeneous plastic protein gels resulted.

35, 50, 75 and 100 g portions of potato starch were subsequently added to individual 200 g portions of the aforementioned blended fish-soybean protein gels and the samples mixed, extruded into chips and cooked according to the method of Example I.

The cooked chips were then coated with sodium chloride and monosodium glutamate, and some samples were coated with flavouring agents, including Bar-B-Que, Onion and Garlic, and Vinegar flavours. The fried chips had good texture, appearance, color, crispness, mouth-feel and palatability as evaluated by a taste panel.

Similar satisfactory results were obtained when potato starch was replaced by the other flours and starches outlined under Examples I and II, both individually and in mixtures.

Food products prepared utilizing fish-soybean gel blends, as set out in Example III, have the advantages of somewhat lower cost and nutritional superiority, respectively, to corresponding food products prepared utilizing fish gel or soybean gel individually.

During the course of work upon which Examples I to III are based, chips were prepared from samples containing 10, 15 and 25 g of starch or flour per 200 g of fish gel, soybean gel and the mixtures thereof. The chips thus produced proved to be of inferior quality, the major objection voiced by evaluators being poor mouth-feel, characterized as sandy or gritty.

EXAMPLE IV

Four separate 75 g portions of each of potato starch, potato flour, modified and unmodified corn starch, and rice flour, were added to separate 200 g portions of fish gel prepared according to the method of Example I so as provide quadruplicate samples of each combination of fish gel and starch or flour. No fat was added to one sample of each of the quadruplicate sets of samples, whereas to the remaining three samples of each set fat was added in respective amounts of 20 g, 25 g, and 30 g. Each sample was then well mixed by a kitchen blender and the blended mass transformed either into wafer or chip form by a forming extruder or molded into a rectangular form of dimensions 5×9×0.5 cms. Samples of the chips and the molded form were then either baked in a conventional or microwave oven. Samples of the baked products were coated with sodium chloride, monosodium glutamate and selected flavouring materials.

All steps prior to cooking were, of course, carried out at a temperature of 5° C. or less in order to prevent degradation of the fish gel component.

The protein content ranged from 14.7 to 17.2% and the moisture content ranged from 22 to 42.5%. In this range of protein content the baked product had good texture, appearance, mouth-feel and palatability, as evaluated by a taste panel. On account of the relatively high water content the baked product is kept frozen preferably at −20° C. during storage, and is heated just prior to serving, i.e., a "heat and serve" item.

The use of mixtures of the various starches or flours already outlined under Example I, resulted in entirely acceptable products.

Satisfactory results were obtained when 200 g portion of soybean gel, prepared according to the method of Example II, or 200 g portion of a 1:1 fish-soybean protein gel prepared according to Example III, replaced the fish gel as the protein component.

As will be readily apparent to those skilled in the art, a host of food colouring materials, flavouring and flavour-enhancing agents may be utilized, in various amounts and combinations, to provide snack foods having particular visual and taste characteristics. Likewise, the size and shape of individual pieces of the snack food is not a limiting factor, so long as size and shape meet with consumer acceptance.

Other modifications and variations, falling within the true broad spirit and scope of the invention, will be obvious to those skilled in the art.

We claim:

1. A method of preparing a high-protein snack food, comprising admixing a plastic protein gel selected from the group consisting of fish gel, soybean gel, and mixtures of fish gel and soybean gel with about 17 to 50 percent by weight, of the gel, of dry starch or flour to obtain a homogeneous mass of gel-starch material, forming the material into desired shaped, said protein gel containing sufficient water to render said gel pliable without the need for the addition of any further water, and thereafter cooking the material, and wherein all steps prior to cooking are carried out at a temperature of 5° C. or less when fish gel is present.

2. A method according to claim 1, wherein the starch or flour is selected from one or more members of the group consisting of potato starch, potato flour, modified or unmodified corn starch and rice flour.

3. A method according to claim 2 wherein in the admixing step one or more additives selected from the group consisting of thickening, stabilizing and emulsifying agents, pH adjusters and gums are included.

4. A method according to claim 3, wherein the cooked snack food is coated with at least one member of the group consisting of flavouring agents and flavour-enhancing agents.

5. A method according to claim 2, wherein the cooking is by frying.

6. A method according to claim 3, wherein the cooking is by frying.

7. A method according to claim 4, wherein the cooking is by frying.

8. A method according to claim 2, wherein the cooking is by frying at a temperature of about 180° C.

9. A method according to claim 3, wherein the cooking is by frying at a temperature of about 180° C.

10. A method according to claim 4, wherein the cooking is by frying at a temperature of about 180° C.

11. A method according to claim 2, wherein the cooking is by frying in vegetable oil at a temperature of about 180° C.

12. A method according to claim 3, wherein the cooking is by frying in vegetable oil at a temperature of about 180° C.

13. A method according to claim 4, wherein the cooking is by frying in vegetable oil at a temperature of about 180° C.

14. A method according to claim 2, wherein at least one member of the group consisting of edible fats and oils is included during the admixing step, and cooking is effected by baking or frying.

15. A method according to claim 3, wherein at least one member of the group consisting of edible fats and oils is included during the admixing step, and cooking is effected by baking or frying.

16. A method according to claim 4, wherein at least one member of the group consisting of edible fats and oils is included during the admixing step, and cooking is effected by baking or frying.

17. A method according to claim 3 wherein the gums are selected from the group consisting of algin and carrageenin.

18. A method according to claim 1, wherein said plastic protein gel is selected from the group consisting of fish gel, and mixtures of fish gel and soybean gel.

19. A method of preparing a high-protein snack food, comprising admixing a plastic protein gel selected from the group consisting of fish gel, and mixtures of fish gel and soybean gel with about 17 to 50 percent by weight, of the gel, of dry starch or flour to obtain a homogeneous mass of gel-starch material, forming the material into desired shapes and thereafter cooking the material, and wherein all steps prior to cooking are carried out at a temperature of 5° C. or less.

* * * * *